Feb. 15, 1938.  S. V. HANSSON  2,108,486
ENDLESS CONVEYING STRIP FOR HARVESTERS
Filed March 9, 1937
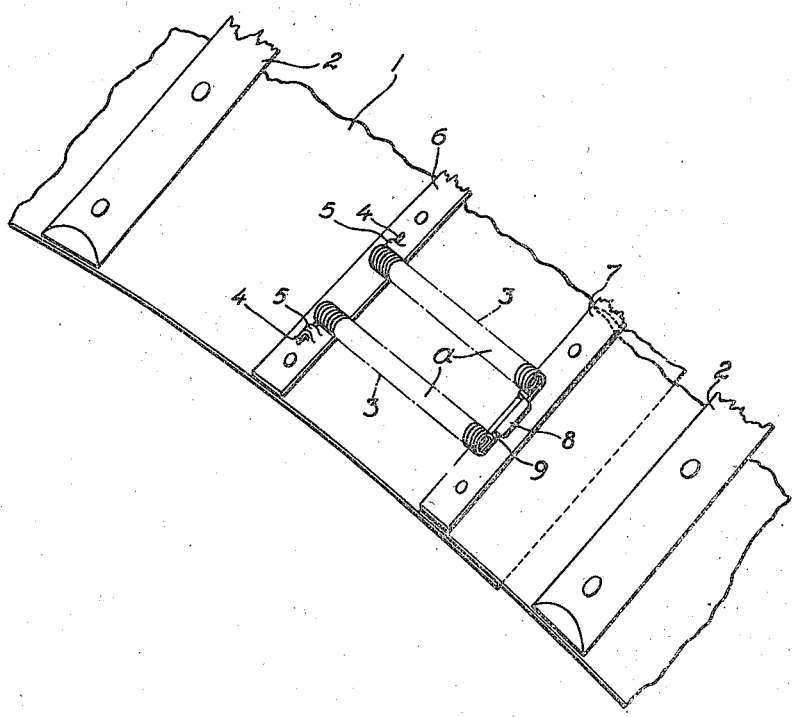
Inventor,
Sigfrid Valentino Hansson
by Heard Smith & Tennant
att'ys Patented Feb. 15, 1938

2,108,486

UNITED STATES PATENT OFFICE 2,108,486

ENDLESS CONVEYING STRIP FOR HARVESTERS

Sigfrid Valentin Hansson, Langshyttan, Sweden

Application March 9, 1937, Serial No. 129,780
In Sweden March 9, 1936

1 Claim. (Cl. 24—32)

The present invention relates to improvements in endless conveying strips for harvesters, and particularly strips of the kind having at least one joint extending across the strip, and according to the invention the strip is so held together by one or more resilient members disposed on its upper side, that the said strip ends overlap each other more or less. This invention has been made to provide for a reliable but resilient jointing, which does not in any way affect the smooth working of the machine, even if metallic strips, preferably such made of rust proof steel, are used.

An embodiment of the invention is illustrated in the accompanying drawing, part of a conveying strip being shown in perspective.

Referring to the drawing numeral 1 indicates the metallic strip, which is integrally made or composed of sections, to which strip the common wooden cross laths 2 are riveted. In the embodiment shown each resilient connecting member serving for keeping the transverse joint of the strip together consists of a yoke-shaped wire member $a$. Such wire members are suitably spaced along the joint, although only one such member is shown in the drawing. As will be seen from the drawing the legs of the yoke-shaped wire connecting member consist of coil-shaped contracting springs 3, the free ends 4 of which are bent away from each other in the plane of the yoke and inserted in ears 5 formed from a transversal reinforcing rail 6 fixed at one end of the strip. At the other end of the strip, which to some extent overlaps the first mentioned strip end, there is fixed a corresponding reinforcing rail 7, from which a hook member 8 is formed with which the central portion 9 of the wire member $a$ may be united in the manner shown in the drawing.

By constructing the joining members in the hereinbefore described manner not only the required resilient joining but also a joining is obtained, which may be very easily taken apart. Further, the construction provides the possibility of quickly exchanging joining members because, when exchanging the joining members, the yoke legs need only be approached to each other to cause the leg ends 4 to disengage from the ears 5.

Even if the above described embodiment thus possesses many advantages and, therefore, can be regarded as the preferred embodiment, yet several others may be devised within the scope of the invention. Thus, each resilient member may consist of one single coil spring, one or both ends of which may be detachably united with the strip ends.

Having now described my invention, what I claim as new and desire to secure by Letters Patent is:

Means for fastening the overlapping ends of endless conveyor strips for harvesters, said means comprising a hook member secured to one of the overlapping ends, two apertured ears secured to the other overlapping end and a U-shaped connecting member having its legs in the form of contracting coil springs and having its bridge portion engaged with the hook member, the end of each leg being bent outwardly and extending through the aperture of one of the ears.

SIGFRID VALENTIN HANSSON.